US012594956B2

(12) United States Patent
Kim et al.

(10) Patent No.: US 12,594,956 B2
(45) Date of Patent: Apr. 7, 2026

(54) METHOD FOR PROVIDING INFORMATION ON RAINY ENVIRONMENT BY REFERRING TO POINT DATA ACQUIRED FROM A LiDAR SENSOR AND COMPUTING DEVICE USING THE SAME

(71) Applicant: Autonomous A2Z, Gyeongsan-si (KR)

(72) Inventors: Jungdae Kim, Yongin-si (KR); Youngchul Oh, Seongnam-si (KR); Ji Hyeong Han, Anyang-si (KR)

(73) Assignee: Autonomous A2Z, Gyeongsan-si (KR)

( * ) Notice: Subject to any disclaimer, the term of this patent is extended or adjusted under 35 U.S.C. 154(b) by 245 days.

(21) Appl. No.: 18/517,749

(22) Filed: Nov. 22, 2023

(65) Prior Publication Data

US 2025/0115275 A1     Apr. 10, 2025

(30) Foreign Application Priority Data

Oct. 4, 2023     (KR) ........................ 10-2023-0132094

(51) Int. Cl.
B60W 60/00          (2020.01)

(52) U.S. Cl.
CPC ..... B60W 60/001 (2020.02); B60W 2420/408 (2024.01); B60W 2554/4049 (2020.02)

(58) Field of Classification Search
CPC ....... B60W 60/001; B60W 2554/4049; B60W 2420/408
See application file for complete search history.

(56) References Cited

U.S. PATENT DOCUMENTS

2024/0116514 A1*     4/2024   Shane .................. G06V 20/588

FOREIGN PATENT DOCUMENTS

WO      WO-2022055873 A1 *   3/2022   ........... G01S 7/4817

OTHER PUBLICATIONS

Rasshofer et al., "Influences of weather phenomena on automotive laser radar systems", 2011, Copernicus Publications, Advances in Radio Science edition 9, p. 49-60 (Year: 2011).*
Zhou,Xiaotong; Noisy Point Identification Method for Laser Radar, and Laser Radar System; Dated: May 7, 2019; pp. 26.
Urmson, Christopher, Paul; Detecting Road Weather Conditions; Dated: Sep. 19, 2013; pp. 45.
Zhu, Jiajun; Methods and Systems for Detecting Weather Conditions Using Vehicle Onboard Sensors; Dated: Apr. 7, 2014; pp. 60.
Korean Office Action for Application No. 10-2023-0132094 filed Oct. 4, 2023; Dated Sep. 25, 2025; pp. 6.

* cited by examiner

*Primary Examiner* — Kenneth M Dunne
(74) *Attorney, Agent, or Firm* — Rimon Law, P.C.

(57)          ABSTRACT
Methods disclosed herein provide rainy environmental information by, on condition that a detection area is determined as an area of within a specific distance from a LiDAR sensor mounted on an autonomous vehicle, and laser transmission pulses are emitted through a 1-st layer to an N-th Layer of the LiDAR sensor, a computing device acquires all the point data from laser reflected pulses, within the detection area. Additionally, the computing device accumulates specific point data, among all the point data, which satisfy a specific criterion related to a rainy environment over a period of time, and detects the rainy environment by referring to the accumulated specific point data.

18 Claims, 6 Drawing Sheets

FIG. 2

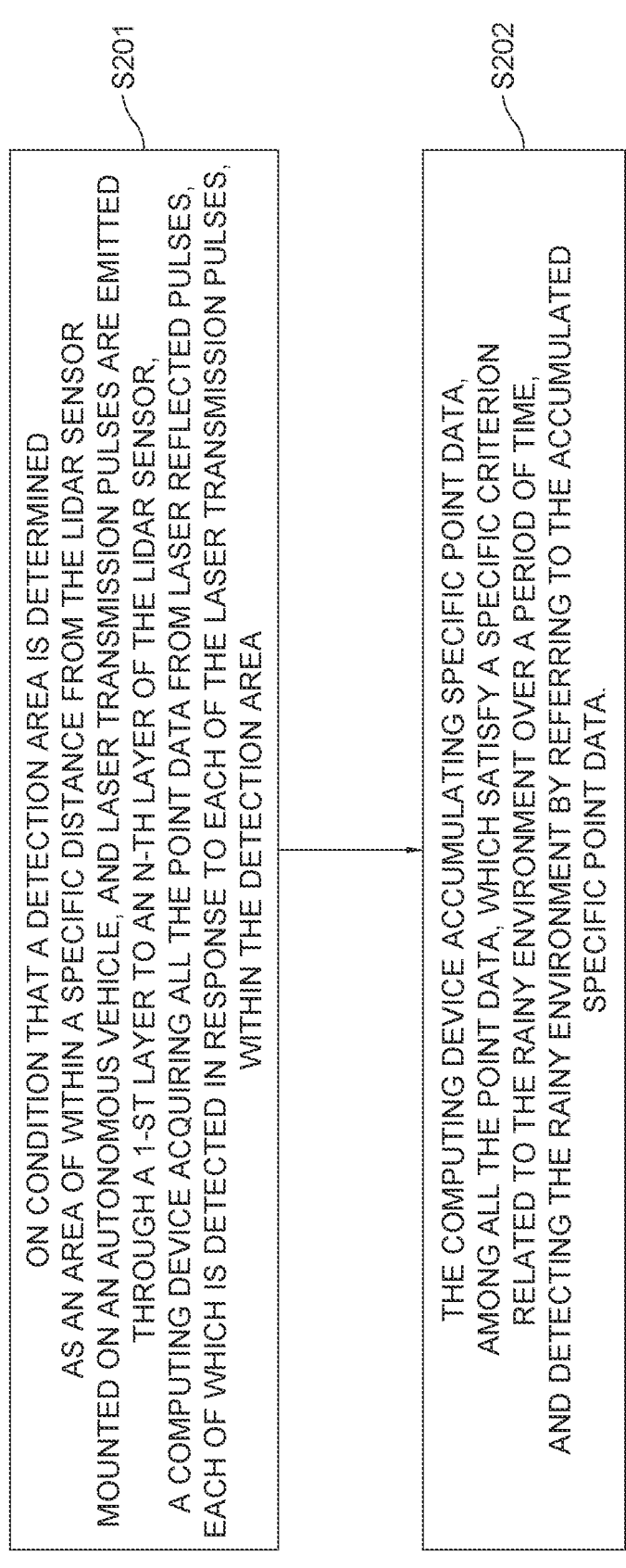

S201

ON CONDITION THAT A DETECTION AREA IS DETERMINED AS AN AREA OF WITHIN A SPECIFIC DISTANCE FROM THE LIDAR SENSOR MOUNTED ON AN AUTONOMOUS VEHICLE, AND LASER TRANSMISSION PULSES ARE EMITTED THROUGH A 1-ST LAYER TO AN N-TH LAYER OF THE LIDAR SENSOR, A COMPUTING DEVICE ACQUIRING ALL THE POINT DATA FROM LASER REFLECTED PULSES, EACH OF WHICH IS DETECTED IN RESPONSE TO EACH OF THE LASER TRANSMISSION PULSES, WITHIN THE DETECTION AREA

S202

THE COMPUTING DEVICE ACCUMULATING SPECIFIC POINT DATA, AMONG ALL THE POINT DATA, WHICH SATISFY A SPECIFIC CRITERION RELATED TO THE RAINY ENVIRONMENT OVER A PERIOD OF TIME, AND DETECTING THE RAINY ENVIRONMENT BY REFERRING TO THE ACCUMULATED SPECIFIC POINT DATA.

METHOD FOR PROVIDING INFORMATION ON RAINY ENVIRONMENT BY REFERRING TO POINT DATA ACQUIRED FROM A LiDAR SENSOR AND COMPUTING DEVICE USING THE SAME

CROSS REFERENCE OF RELATED APPLICATION

This present application claims the benefit of the earlier filing date of Korean non-provisional patent application No. 10-2023-0132094, filed on Oct. 4, 2023, the entire contents of which being incorporated herein by reference.

FIELD OF THE DISCLOSURE

The present disclosure relates to a method for providing information on rainy environment by referring to point data acquired from a LiDAR sensor and a computing device using the same.

BACKGROUND OF THE DISCLOSURE

A LiDAR sensor provides raw data with a normal range for an object recognition based on multiple layers of the LiDAR sensor and point data acquired from each of the layers. However, characteristics of the point data acquired during rainy environment have many differences from those of the point data acquired during non-rainy environment. As one example, a performance of the object recognition of the LiDAR sensor may be degraded under the rainy environment because other point data are also detected by the LiDAR sensor due to raindrops falling or bouncing.

Therefore, the applicant has invented a method for providing information on the rainy environment by referring to point data accumulated by using the LiDAR sensor and a method for distinguishing the point data of the object from the point data of the raindrops to improve the performance of the object recognition of the LiDAR sensor under the rainy environment.

SUMMARY OF THE DISCLOSURE

It is an object of the present disclosure to solve all the aforementioned problems.

It is another object of the present disclosure to determine a detection area within a close distance from a LiDAR sensor, extract some part of point data, having probabilities of being considered as rainy environment larger than a threshold probability, among all the point data obtained by the LiDAR sensor, and detect the rainy environment by referring to the point data accumulated over a period of time.

It is still another object of the present disclosure to determine at least part of new point data, whose intensity is larger than or equal to a first threshold intensity, as an object by referring to all the new point data acquired from the LiDAR sensor, determine a total target detecting region including a clustered region for the object and its adjacent region, and consider some other part of the new point data, whose intensity is smaller than a second threshold intensity, in the total target detecting region as raindrops bouncing due to the object, thereby improving a performance of object recognition of the LiDAR sensor.

In accordance with one example embodiment of the present disclosure, there is provided a method for providing information on rainy environment by referring to a plurality of point data acquired from a LiDAR sensor, comprising steps of: (a) on condition that a detection area is determined as an area of within a specific distance from the LiDAR sensor mounted on an autonomous vehicle, and laser transmission pulses are emitted through a 1-st layer to an N-th Layer of the LiDAR sensor, a computing device acquiring all the point data from laser reflected pulses, each of which is detected in response to each of the laser transmission pulses, within the detection area; and (b) the computing device accumulating specific point data, among all the point data, which satisfy a specific criterion related to the rainy environment over a period of time, and detecting the rainy environment by referring to the accumulated specific point data.

As one example, the step (b) includes steps of: (b1) the computing device determining whether each of intensities of each of all the point data acquired from the laser reflected pulses is weaker than or equal to a 1-st threshold intensity, thereby determining 1-st partial point data, whose intensity is weaker than or equal to the 1-st threshold intensity, among all the point data acquired from the laser reflected pulses; (b2) the computer device determining whether each of the 1-st partial point data has any neighboring continuous 1-st partial point data within a threshold distance, thereby determining 2-nd partial point data which does not have any of the neighboring continuous 1-st partial point data within the threshold distance, among the 1-st partial point data; and (b3) the computing device determining each of the 2-nd partial point data as the specific point data, and detecting the rainy environment by referring to the accumulated specific point data accumulated over the period of the time.

As one example, the step (b2) has steps of: (b21) the computing device determining whether each of the 1-st partial point data has at least one other 1-st partial point data which is less distant than a 1-st threshold distance within a same angular range in its corresponding one or more adjacent layers, thereby determining some part of the 1-st partial point data, which does not have said other 1-st partial point data which is less distant than the 1-st threshold distance, as (1_1)-st partial point data; (b22) the computing device determining whether each of the (1_1)-st partial point data has at least one other (1_1)-st partial point data which is less distant than a 2-nd threshold distance in its corresponding same layer, thereby determining some part of the (1_1)-st partial point data, which does not have said other (1_1)-st partial point data which is less distant than a 2-nd threshold distance in its corresponding same layer, as the 2-nd partial point data.

As one example, the step (b3) has steps of: (b31) the computing device determining each of the 2-nd partial point data as the specific point data, and accumulating the specific point data over the period of the time, thereby acquiring an accumulated representative value; and (b32) the computing device comparing the accumulated representative value with an accumulated criterion value which is acquired by accumulating some part of the point data related to noise in a non-rainy environment, and when the accumulated representative value is larger than the accumulated criterion value, detecting the rainy environment by referring to the specific point data.

As one example, the method further comprises steps of: (c) the computing device determining, as an object, a region where each of intensities of a plurality of new point data is greater than or equal to a 2-nd threshold intensity by referring to the new point data acquired from new laser reflected pulses, and clustering 1-st partial new point data corresponding to the object, thereby detecting a bounding box of an object, wherein the bounding box represents a first-type virtual box circumscribing the object or a second virtual box enlarging the first-type virtual box; (d) the computing device monitoring a movement of the object to compute a rear trajectory region of the object, and determining a total target detecting region which includes the bounding box and the rear trajectory region of the object; and (e) the computing device additionally determining raindrops bouncing due to the object by referring to 2-nd partial new point data, whose intensity is less than a 3-rd threshold intensity, among a subset of the new point data in the total target detecting region.

As one example, at the step (d), when the object moves at a speed faster than or equal to a specific threshold speed, the computing device saves each of movement states of the bounding box of the object for each unit of time, thereby determining a region containing the bounding box at a current unit of time and the bounding boxes at one or more previous units of time as the rear trajectory region.

As one example, at the step (d), the total target detecting region includes the bounding box, the rear trajectory region, a pair of 1-st side regions on both sides of the bounding box, and a pair of 2-nd side regions on both sides of the rear trajectory region.

As one example, at the step (e), the computing device prevents one or more detection errors on the bounding box without clustering the 2-nd partial new point data, whose intensity is weaker than the 3-rd threshold intensity, among the subset of the new point data in the total target detecting region.

As one example, at the step (c), the computing device acquires one or more partial lines of the bounding box by clustering the 1-st partial new point data corresponding to the object and thus predicts a rest of the partial lines of the bounding box, thereby detecting the bounding box.

As one example, at the step (a), the computing device determines a virtual polyhedron where the point data are detected as the detection area, wherein the virtual polyhedron is set within the specific distance from the LiDAR sensor and wherein the virtual polyhedron is divided by the 1-st layer to the N-th layer.

In accordance with another aspect of the present disclosure, there is provided a computing device for providing information on rainy environment by referring to a plurality of point data acquired from a LiDAR sensor, comprising: at least one memory which saves instructions; and at least one processor configured to execute the instructions to perform or support another device to perform processes of: (I) on condition that a detection area is determined as an area of within a specific distance from the LiDAR sensor mounted on an autonomous vehicle, and laser transmission pulses are emitted through a 1-st layer to an N-th Layer of the LiDAR sensor, acquiring all the point data from laser reflected pulses, each of which is detected in response to each of the laser transmission pulses, within the detection area; and (II) accumulating specific point data, among all the point data, which satisfy a specific criterion related to the rainy environment over a period of time, and detecting the rainy environment by referring to the accumulated specific point data.

As one example, the process (II) includes processes of: (II_1) determining whether each of intensities of each of all the point data acquired from the laser reflected pulses is weaker than or equal to a 1-st threshold intensity, thereby determining 1-st partial point data, whose intensity is weaker than or equal to the 1-st threshold intensity, among all the point data acquired from the laser reflected pulses; (II_2) determining whether each of the 1-st partial point data

4 has any neighboring continuous 1-st partial point data within a threshold distance, thereby determining 2-nd partial point data which does not have any of the neighboring continuous 1-st partial point data within the threshold distance, among the 1-st partial point data; and (II_3) determining each of the 2-nd partial point data as the specific point data, and detecting the rainy environment by referring to the accumulated specific point data accumulated over the period of the time.

As one example, the process (II2) has processes of: (II_21) determining whether each of the 1-st partial point data has at least one other 1-st partial point data which is less distant than a 1-st threshold distance within a same angular range in its corresponding one or more adjacent layers, thereby determining some part of the 1-st partial point data, which does not have said other 1-st partial point data which is less distant than the 1-st threshold distance, as (1_1)-st partial point data; and (II_22) determining whether each of the (1_1)-st partial point data has at least one other (1_1)-st partial point data which is less distant than a 2-nd threshold distance in its corresponding same layer, thereby determining some part of the (1_1)-st partial point data, which does not have said other (1_1)-st partial point data which is less distant than a 2-nd threshold distance in its corresponding same layer, as the 2-nd partial point data.

As one example, the process (II_3) has processes of: (II_31) determining each the 2-nd partial point data as the specific point data, and accumulating the specific point data over the period of the time, thereby acquiring an accumulated representative value; and (II_32) comparing the accumulated representative value with an accumulated criterion value which is acquired by accumulating some part of the point data related to noise in a non-rainy environment, and when the accumulated representative value is larger than the accumulated criterion value, detecting the rainy environment by referring to the specific point data.

As one example, the processor further performs processes of: (III) determining, as an object, a region where each of intensities of a plurality of new point data is greater than or equal to a 2-nd threshold intensity by referring to the new point data acquired from new laser reflected pulses, and clustering 1-st partial new point data corresponding to the object, thereby detecting a bounding box of an object, wherein the bounding box represents a first-type virtual box circumscribing the object or a second virtual box enlarging the first-type virtual box; (IV) monitoring a movement of the object to compute a rear trajectory region of the object, and determining a total target detecting region which includes the bounding box and the rear trajectory region of the object; and additionally determining raindrops bouncing due to the (V) object by referring to 2-nd partial new point data, whose intensity is less than a 3-rd threshold intensity, among a subset of the new point data in the total target detecting region.

As one example, at the process (IV), when the object moves at a speed faster than or equal to a specific threshold speed, the processor saves each of movement states of the bounding box of the object for each unit of time, thereby determining a region containing the bounding box at a current unit of time and the bounding box at one or more previous units of time as the rear trajectory region.

As one example, at the process (IV), the total target detecting region includes the bounding box, the rear trajectory region, a pair of 1-st side regions on both sides of the bounding box, and a pair of 2-nd side regions on both sides of the rear trajectory region.

As one example, at the process (IV), the processor prevents one or more detection errors on the bounding box without clustering the 2-nd partial new point data, whose intensity is weaker than the 3-rd threshold intensity, among the subset of the new point data in the total target detecting region.

As one example, at the process (III), the processor acquires one or more partial lines of the bounding box by clustering the 1-st partial new point data corresponding to the object and thus predicts a rest of the partial lines of the bounding box, thereby detecting the bounding box.

As one example, at the process (I), the processor determines, as the detection area, a virtual polyhedron where the point data are detected, wherein the virtual polyhedron is set within the specific distance from the LiDAR sensor and wherein the virtual polyhedron is divided by the 1-st layer to the N-th layer.

BRIEF DESCRIPTION OF THE DRAWINGS

The accompanying drawings used to explain example embodiments of the present disclosure are only part of example embodiments of the present disclosure and other drawings can be obtained based on the accompanying drawings by those skilled in the art of the present disclosure without inventive work.

FIG. 2 is a flow chart schematically illustrating a method for providing the information on the rainy environment by referring to the point data acquired from the LiDAR sensor in accordance with one example embodiment of the present disclosure.

DETAILED DESCRIPTION OF THE PREFERRED EMBODIMENTS

Figure 1:
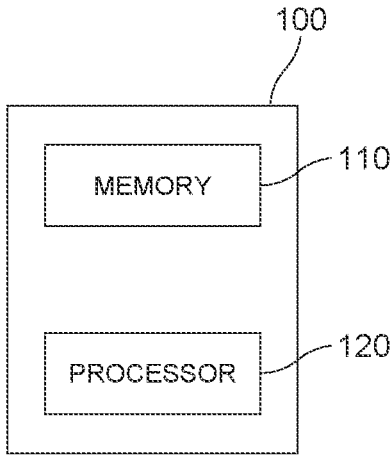
FIG. 1 is a drawing schematically illustrating a configuration of a computing device which provides information on rainy environment by referring to point data acquired from a LiDAR sensor.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components, or steps. Other objects, benefits and features of the present disclosure will be revealed to one skilled in the art, partially from the specification and partially from the implementation of the present disclosure. The following examples and drawings will be provided as examples, but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

FIG. 1 is a drawing schematically illustrating a configuration of a computing device which provides information on rainy environment by referring to point data acquired from a LiDAR sensor.

By referring to FIG. 1, a computing device 100, which provides information on the rainy environment by referring to the point data acquired by the LiDAR sensor, includes at least one memory 110 and at least one processor 120.

The memory 110 of the computing device 100 stores at least one instruction which is performed by the processor 120. In detail, the instruction is code generated to command the computing device 100 to function in a specific way, and the instruction may be stored in machine-readable memories or machine-decipherable memories. The instruction can perform processes which are explained later.

Further, the processor 120 of the computing device 100 may include following hardware components: a micro processing unit, i.e., MPU, a central processing unit, i.e., CPU, a cache memory, and a data bus. Further, the computing device 100 also includes following software components: at least one operation system and at least one application on specific purposes.

Also, the computing device may be interlinked with at least one database. Herein, the database may include at least one type of storage medium among following types: a flash memory type, a hard disk type, a multimedia card micro type, a card type memory (for instance, an SD memory or an XD memory), a random-access memory, i.e., RAM, a static random-access memory, i.e., SRAM, a read-only memory, i.e., ROM, an electrically erasable programmable read-only memory, i.e., EEPROM, a magnetic memory, a magnetic disk, an optical disk, but it is not limited thereto, such that the database also include all storage mediums capable of saving data. Also, the database may be configured in a separated place from the computing device 100. In contrary, the database may also be configured inside the computing device 100 to send data to the computing device 100 or to write received data. For convenience, the number of the database 120 may be one but two or more as the case may be.

In accordance with present disclosure, a method using the computing device 100 can be explained by referring to FIG. 2.

FIG. 2 is a flow chart schematically illustrating a method for providing the information on the rainy environment by referring to the point data acquired from the LiDAR sensor in accordance with one example embodiment of the present disclosure.

By referring to FIG. 2, on condition that a detection area is determined as an area of within a specific distance from the LiDAR sensor mounted on an autonomous vehicle and laser transmission pulses have been emitted through a 1-st layer to an N-th Layer of the LiDAR sensor, the computing device 100 acquires all the point data from laser reflected pulses, each of which is detected in response to each of the laser transmission pulses, within the detection area at a step of S201.

Figure 3:
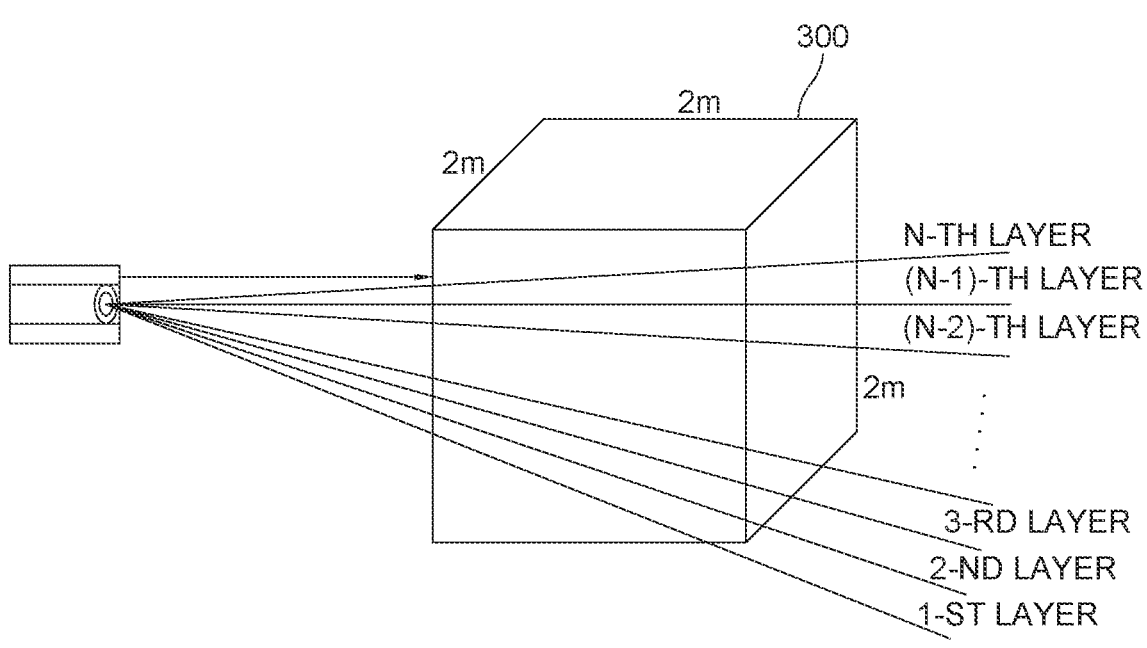
FIG. 3 is a drawing exemplarily illustrating a process of determining a detection area for covering a 1-st layer to an N-th layer of the LiDAR sensor within a specific distance from the LiDAR sensor in accordance with one example embodiment of the present disclosure.

FIG. 3 is a drawing exemplarily illustrating a process of determining the detection area for covering the 1-st layer to the N-th layer of the LiDAR sensor within a specific distance from the LiDAR sensor in accordance with one example embodiment of the present disclosure.

As one example, by referring to FIG. 3, the detection area 300 is set within the specific distance from the LiDAR sensor such that the point data can be detected in the detection area 300 through which the 1-st layer to N-layer of the LiDAR sensor can pass.

Herein, the detection area 300 may be set as a cubic shape, but it is not limited thereto.

Specifically, the computing device 100 can acquire all the point data from each of the laser reflected pulses through each of the 1-th layer to the N-th layer within the detection area 300 in a polyhedron shape.

Figure 4:
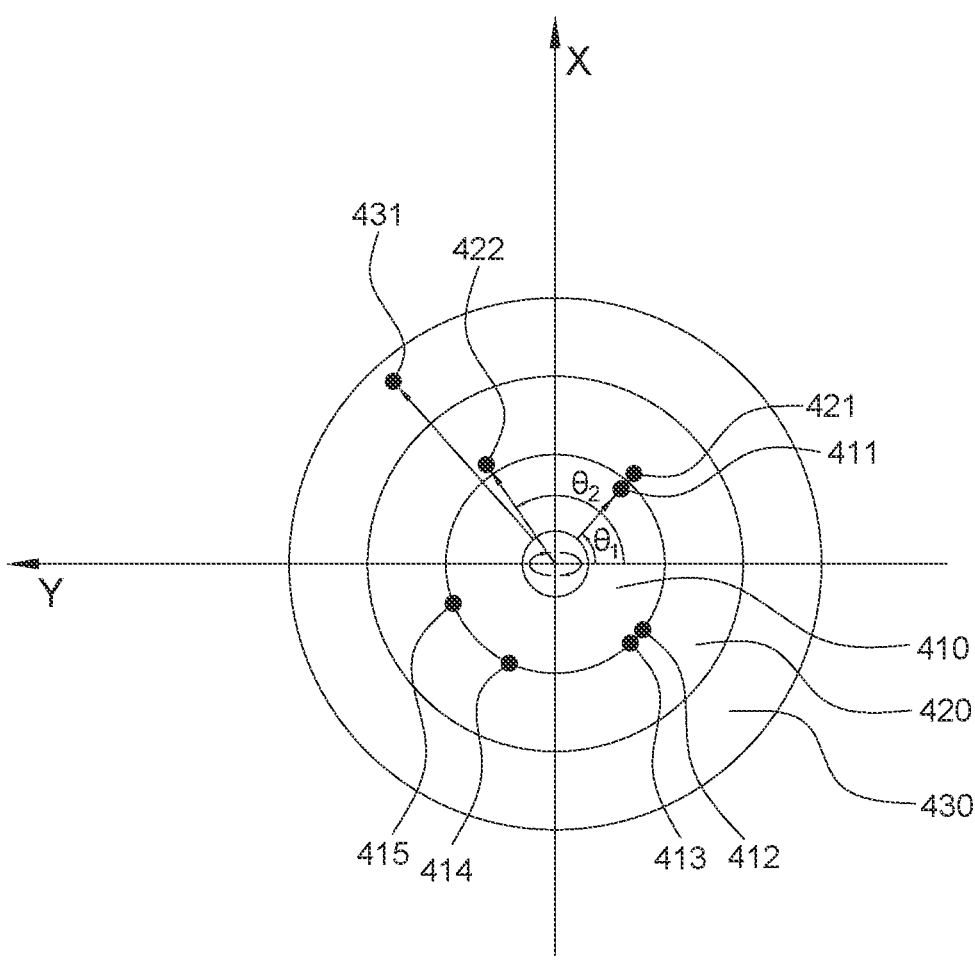
FIG. 4 is a drawing exemplarily illustrating a process of acquiring all the point data corresponding to the 1-st layer to the N-th layer in accordance with one example embodiment of the present disclosure.

FIG. 4 is a drawing exemplarily illustrating a process of acquiring all the point data corresponding to the 1-st layer to the N-th layer in accordance with one example embodiment of the present disclosure.

As one example, by referring to FIG. 4, if it is assumed that the detection area 300 has been set as virtual space covering a 1-st quadrant and a 2-nd quadrant, the computing device 100 may acquire all point data 411, 421, 422, 431 through multiple layers of the LiDAR sensor.

Next, the computing device 100 may accumulate specific point data, among all the point data, which satisfy a specific criterion related to the rainy environment over a period of time, and detect the rainy environment by referring to the accumulated specific point data at a step of S202.

Technically speaking, intensities of multiple point data corresponding to common objects, e.g., cars, buildings, pedestrians, and street trees, are much greater than intensities of multiple point data corresponding to raindrops. Accordingly, the point data corresponding to the raindrops can be distinguished from the point data corresponding to the common object.

In detail, at the step of S202, some point data, whose intensity is greater than a 1-st threshold intensity, among all the point data can be considered as acquired from the common objects, while the rest of point data, whose intensity is weaker than or equal to the 1-st threshold intensity, can be considered as 1-st partial point data, each of which has some probability of being considered as the point data corresponding to the raindrops.

Then, since some part of the 1-st partial point data having any neighboring continuous 1-st partial point data within a threshold distance have low probabilities of being considered as the raindrops, said some part of the 1-st partial point data can be regarded as acquired from the common objects. That is, said some part of the 1-st partial point data and its neighboring continuous 1-st partial point data can be excluded from the possible candidates for the point data corresponding to the raindrops, because one raindrop cannot be larger than a well-known size. In contrast, some other part of the 1-st partial point data, each of which does not have any of the neighboring continuous 1-st partial point data within the threshold distance, are determined as 2-nd partial point data.

Specifically, by referring to FIG. 4, if it is assumed that the detection area 300 covers all the space of the 1-st quadrant and the 2-nd quadrant, and that the 1-st partial point data 411, 421, 422 and 431, whose intensity is weaker than or equal to the 1-st threshold intensity, are detected from the detection area 300, the two point data 411 and 421 can be considered as an example of the neighboring continuous point data within the threshold distance. In detail, the two point data 411 and 421 are acquired respectively from adjacent layers within the 1-st threshold distance with the same angular coordinate θ1. Herein, even if it is assumed that the angular coordinate of the point data 411 and the angular coordinate of the point data 421 are not exactly the same, in case an angular difference therebetween is not larger than a threshold angular difference, the two point data 411 and 421 can be considered as the neighboring continuous point data. In contrast, the two point data 421 and 431 may not be considered as the neighboring continuous point data because the distance between the point data 421 and the point data 431 is longer than the 1-st threshold distance even though they are acquired from the adjacent layers with the same angular coordinate 02.

As another example, by referring to FIG. 4, if it is assumed that the detection area 300 covers all space of a 3-rd quadrant and a 4-th quadrant, and that the 1-st partial point data 412, 413, 414 and 415, whose intensity is weaker than or equal to the 1-st threshold intensity, are detected from the detection area 300, the two point data 412 and 413 can be considered as an example of the neighboring continuous point data within a 2-nd threshold distance. The two point data 412 and 413 are acquired respectively from the same layer within the 2-nd threshold distance. Herein, the 1-st threshold distance may be different from the 2-nd threshold distance, but it is not limited thereto.

That is, the two point data 411 and 421 whose distance therebetween is shorter than the 1-st threshold distance and the two point data 412 and 413 whose distance therebetween is shorter than the 2-nd threshold distance may be considered as the point data from the common objects, while the two point data 414 and 415 and the two point data 422 and 431, i.e., the discrete 1-st partial data, can be considered as the 2-nd partial point data.

Turning back to the step of S202, the point data corresponding to the raindrops can be distinguished from the point data corresponding to noise in non-rainy environment because intensities of noisy point data in the non-rainy environment are usually weaker than intensities of the point data corresponding to the raindrops.

In detail, on condition that each of the 2-nd partial data has been provisionally determined as specific point data each of which satisfies a criterion related to the rainy environment, and an accumulated representative value has been determined by accumulating the specific point data over a period of time, if an accumulated criterion value, which was acquired by accumulating some part of the point data related to the noise in the non-rainy environment, is compared to the accumulated representative value and thus if the accumulated representative value is larger than the accumulated criterion value, the computing device 100 can detect the rainy environment based on an amount of the accumulated specific point data. In detail, since a moving object like a vehicle where the LiDAR sensor is mounted acquires the accumulated representative value while traveling, radial coordinates and angular coordinates of the specific point data may be adjusted based on a moving direction and a moving velocity of the object and then the adjusted specific point data may be accumulated.

Next, on condition that the computing device 100 has detected the rainy environment, the computing device 100 may (i) determine a region, where each of intensities of a plurality of new point data is greater than or equal to a 2-nd threshold intensity, as an object, e.g., another vehicle ahead of the computing device 100 by referring to the new point data acquired from new laser reflected pulses and then (ii) cluster 1-st partial new point data corresponding to the object, thereby detecting a bounding box of the object. Herein, the bounding box represents a first-type virtual box circumscribing the object or a second virtual box enlarging the first-type virtual box, but the latter is more appropriate. Further, the 1-st threshold intensity and the 2-nd threshold intensity may be the same, but it is not limited thereto.

Figure 5:
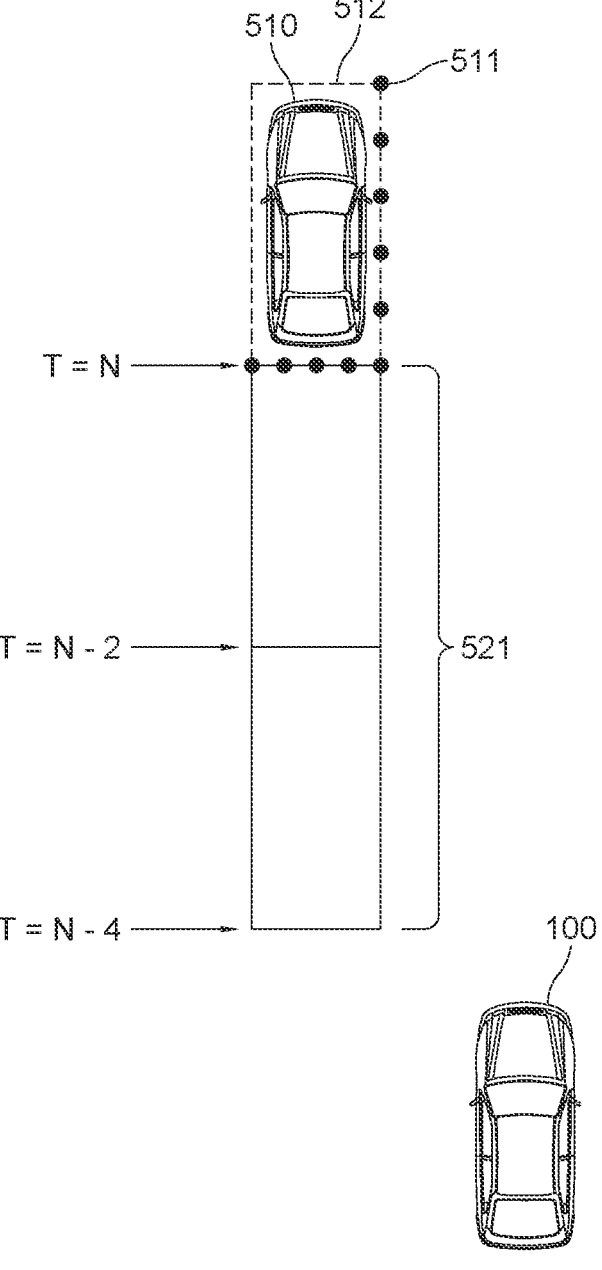
FIG. 5 is a drawing exemplarily illustrating a process of clustering a plurality of new point data determined as an object, tracking a bounding box of the object which is moving for each unit of time, and thus determining a rear trajectory region of the object in accordance with one example embodiment of the present disclosure.

FIG. 5 is a drawing exemplarily illustrating a process of clustering the plurality of new point data determined as the object, tracking the bounding box of the object which is moving for each unit of time, and thus determining a rear trajectory region of the object in accordance with one example embodiment of the present disclosure.

In detail, the computing device 100 detects one or more partial lines of a bounding box 512 of an object 510 by clustering 1-st partial new point data 511 and then predicts other partial lines of the bounding box where the 1-st partial new point data cannot be acquired, thereby recognizing all the four partial lines of the bounding box 512. For convenience, only one point is labeled as 511, but all the points shown in FIG. 5 should be considered as the 1-st partial new point data 511. Also, in FIG. 5, the bounding box 512 of the object 510 is the 2-nd type virtual box, but it is not limited thereto.

Next, the computing device 100 determines at least one rear trajectory region 521 where the object 510 was located at each of previous units of time by tracking the object 510, and thus determines a total target detecting region which includes both the bounding box 512 and the rear trajectory region 521.

In detail, if the object 510 is moving at a certain speed, the computing device 100 may store each of the tracked regions, i.e., the rear trajectory region 521, for each unit of time, and accordingly determine, as the rear trajectory region 521, a region containing the bounding box 512 at a current unit of time and bounding boxes 521 at one or more previous units of time.

Figure 6:
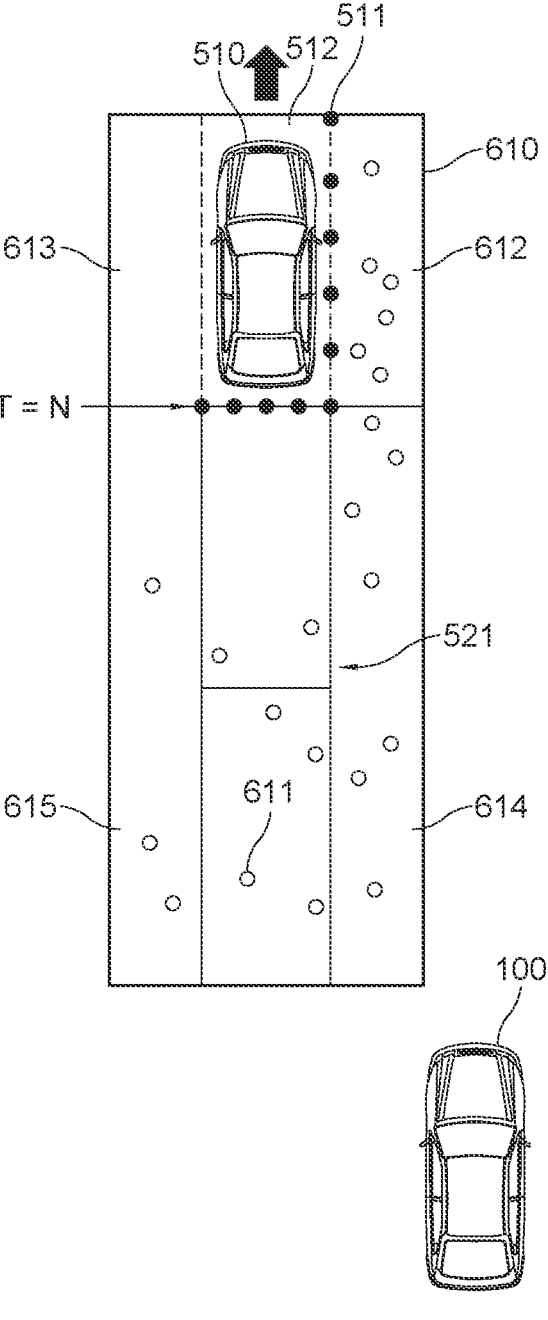
FIG. 6 is a drawing exemplarily illustrating a process of determining a total target detecting region which includes the bounding box of the object at a current unit of time and the rear trajectory region in accordance with one example embodiment of the present disclosure.

FIG. 6 is a drawing exemplarily illustrating a process of determining the total target detecting region which includes the bounding box of the object at a current unit of time and the rear trajectory region in accordance with one example embodiment of the present disclosure.

Herein, the total target detecting region 610 may include the bounding box 512, the rear trajectory region 521, a pair of 1-st side regions 612 and 613 on both sides of the bounding box 512, and a pair of 2-nd side regions 614 and 615 on both sides of the rear trajectory region 521.

Further, the computing device 100 determines the raindrops bouncing due to the object, e.g., the vehicle 510, by referring to 2-nd partial new point data, whose intensity is less than a 3-rd threshold intensity, among a subset of the new point data included in the total target detecting region 610.

In detail, the computing device 100 can detect the raindrops bouncing due to the object by referring to the 2-nd partial new point data 611, whose intensity is weaker than the 3-rd threshold intensity, among the subset of the new point data included in the total target detecting region 610. Further, the computing device 100 can prevent detection errors on the bounding box 512 since the 2-nd partial new point data 611, whose intensity is weaker than the 3-rd threshold intensity, among the subset of the new point data are not clustered in the total target detecting region 610. Although the 2-nd threshold intensity and the 3-rd threshold intensity may be the same, but it is not limited thereto.

The present invention has an effect of determining the detection area within a close distance from the LiDAR sensor, extracting some part of point data, having probabilities of being considered as the rainy environment larger than a threshold probability, among all the point data obtained by the LiDAR sensor, and detecting the rainy environment by referring to the point data accumulated over a period of time.

The present invention has another effect of determining at least part of the new point data, whose intensity is larger than or equal to a first threshold intensity, as the object by referring to all the new point data acquired from the LiDAR sensor, determining the total target detecting region including a clustered region for the object and its adjacent region, and considering some other part of the new point data, whose intensity is smaller than a second threshold intensity, in the total target detecting region as the raindrops bouncing due to the object, thereby improving a performance of the object recognition of the LiDAR sensor.

The suggested processes, which is in accordance with one example embodiment of the present disclosure, can be implemented in a programmed command which can be performed by various computer component, and can be written on a machine-readable medium or machine-decipherable medium. The machine-readable medium or machine-decipherable medium may include program commands, data files, data structures, or combination of aforementioned elements. The program commands written on the machine-readable medium or machine-decipherable medium may be specifically designed or complied only to perform aforementioned processes or may be allowed to use after notices to those skilled in the art of present disclosure. The machine-readable medium or machine-decipherable medium can be one of follow media: a hard disk, a magnetic medium such as a floppy disk or a magnetic tape, an optical medium such as CD-ROM and DVD, a magnetooptical medium such as a floptical disk, a ROM, a RAM, a Flash memory, and other hardware components which are designed to save and perform the program commands. The program commands may be written in one of complied languages or one of interpreted languages. The hardware device may be configured to perform the process of this disclosure as at least one or more software module, and vice versa.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing information on rainy environment by referring to a plurality of point data acquired from a LiDAR sensor, comprising steps of:

(a) on condition that a detection area is determined as an area of within a specific distance from the LiDAR sensor mounted on an autonomous vehicle, and laser transmission pulses are emitted through a 1-st layer to an N-th layer of the LiDAR sensor, where N is an integer greater than 1, a computing device acquiring all the point data from laser reflected pulses, each of which is detected in response to each of the laser transmission pulses, within the detection area;

(b) the computing device accumulating specific point data, among all the point data, which satisfy a specific criterion related to the rainy environment over a period of time, and detecting the rainy environment by referring to the accumulated specific point data;

(c) the computing device determining, as an object, a region where each of intensities of a plurality of new point data is greater than or equal to a 2-nd threshold intensity by referring to the new point data acquired from new laser reflected pulses, and clustering 1-st partial new point data corresponding to the object, thereby detecting a bounding box of the object, wherein the bounding box represents a first-type virtual box circumscribing the object or a second virtual box enlarging the first-type virtual box;

(d) the computing device monitoring a movement of the object to compute a rear trajectory region of the object, and determining a total target detecting region which includes the bounding box and the rear trajectory region of the object; and (e) the computing device additionally determining rain-drops bouncing due to the object by referring to 2-nd partial new point data, whose intensity is less than a 3-rd threshold intensity, among a subset of the new point data in the total target detecting region.

2. A method of claim 1, wherein the step (b) includes steps of:

(b1) the computing device determining whether each of intensities of each of all the point data acquired from the laser reflected pulses is weaker than or equal to a 1-st threshold intensity, thereby determining 1-st partial point data, whose intensity is weaker than or equal to the 1-st threshold intensity, among all the point data acquired from the laser reflected pulses; and (b2) the computer device determining whether each of the 1-st partial point data has any neighboring continuous 1-st partial point data within a threshold distance, thereby determining 2-nd partial point data which does not have any of the neighboring continuous 1-st partial point data within the threshold distance, among the 1-st partial point data; and (b3) the computing device determining each of the 2-nd partial point data as the specific point data and detecting the rainy environment by referring to the accumulated specific point data accumulated over the period of the time.

3. A method of claim 2, wherein the step (b2) has steps of:

(b21) the computing device determining whether each of the 1-st partial point data has at least one other 1-st partial point data which is less distant than a 1-st threshold distance within a same angular range in its corresponding one or more adjacent layers, thereby determining some part of the 1-st partial point data, which does not have said other 1-st partial point data which is less distant than the 1-st threshold distance, as (1_1)-st partial point data; and (b22) the computing device determining whether each of the (1_1)-st partial point data has at least one other (1_1)-st partial point data which is less distant than a 2-nd threshold distance in its corresponding same layer, thereby determining some part of the (1_1)-st partial point data, which does not have said other (1_1)-st partial point data which is less distant than a 2-nd threshold distance in its corresponding same layer, as the 2-nd partial point data.

4. The method of claim 2, wherein the step (b3) has steps of:

(b31) the computing device determining each the 2-nd partial point data as the specific point data, and accumulating the specific point data over the period of the time, thereby acquiring an accumulated representative value; and (b32) the computing device comparing the accumulated representative value with an accumulated criterion value which is acquired by accumulating some part of the point data related to noise in a non-rainy environment, and when the accumulated representative value is larger than the accumulated criterion value, detecting the rainy environment by referring to the specific point data.

5. The method of claim 1, wherein, at the step (d), when the object moves at a speed equal to or faster than a specific threshold speed, the computing device saves each of movement states of the bounding box of the object for each unit of time, thereby determining a region containing the bounding box at a current unit of time and the bounding box at one or more previous units of time as the rear trajectory region.

6. The method of claim 1, wherein, at the step (d), the total target detecting region includes the bounding box, the rear trajectory region, a pair of 1-st side regions on both sides of the bounding box, and a pair of 2-nd side regions on both sides of the rear trajectory region.

7. The method of claim 1, wherein, at the step (e), the computing device prevents one or more detection errors on the bounding box without clustering the 2-nd partial new point data, whose intensity is weaker than the 3-rd threshold intensity, among the subset of the new point data in the total target detecting region.

8. The method of claim 1, wherein, at the step (c), the computing device acquires one or more partial lines of the bounding box by clustering the 1-st partial new point data corresponding to the object and thus predicts a rest of the g the partial lines of the bounding box, thereby detecting bounding box.

9. The method of claim 1, wherein, at the step (a), the computing device determines a virtual polyhedron where the point data are detected as the detection area, wherein the virtual polyhedron is set within the specific distance from the LiDAR sensor and wherein the virtual polyhedron is divided by the 1-st layer to the N-th layer.

10. A computing device for providing information on rainy environment by referring to a plurality of point data acquired from a LiDAR sensor, comprising:

at least one memory which saves instructions;

at least one processor configured to execute the instructions to perform or support another device to perform processes of: (I) on condition that a detection area is determined as an area of within a specific distance from the LiDAR sensor mounted on an autonomous vehicle, and laser transmission pulses are emitted through a 1-st layer to an N-th Layer of the LiDAR sensor, where N is an integer greater than 1, acquiring all the point data from laser reflected pulses, each of which is detected in response to each of the laser transmission pulses, within the detection area; and (II) accumulating specific point data, among all the point data, which satisfy a specific criterion related to the rainy environment over a period of time, and detecting the rainy environment by referring to the accumulated specific point data;

(III) determining, as an object, a region where each of intensities of a plurality of new point data is greater than or equal to a 2-nd threshold intensity by referring to the new point data acquired from new laser reflected pulses, and clustering 1-st partial new point data corresponding to the object, thereby detecting a bounding box of the object, wherein the bounding box represents a first-type virtual box circumscribing the object or a second virtual box enlarging the first-type virtual box;

(IV) monitoring a movement of the object to compute a rear trajectory region of the object, and determining a total target detecting region which includes the bounding box and the rear trajectory region of the object; and (V) additionally determining raindrops bouncing due to the object by referring to 2-nd partial new point data, whose intensity is less than a 3-rd threshold intensity, among a subset of the new point data in the total target detecting region.

11. The computing device of claim 10, wherein the process (II) includes processes of:

(II_1) determining whether each of intensities of each of all the point data acquired from the laser reflected pulses is weaker than or equal to a 1-st threshold intensity, thereby determining 1-st partial point data, whose intensity is weaker than or equal to the 1-st threshold intensity, among all the point data acquired from the laser reflected pulses; and (II_2) determining whether each of the 1-st partial point data has any neighboring continuous 1-st partial point data within a threshold distance, thereby determining 2-nd partial point data which does not have any of the neighboring continuous 1-st partial point data within the threshold distance, among the 1-st partial point data; and (II_3) determining each of the 2-nd partial point data as the specific point data, and detecting the rainy environment by referring to the accumulated specific point data accumulated over the period of the time.

12. The computing device of claim 11, wherein the process (II2) has processes of:

(II_21) determining whether each of the 1-st partial point data has at least one other 1-st partial point data which is less distant than a 1-st threshold distance within a same angular range in its corresponding one or more adjacent layers, thereby determining some part of the 1-st partial point data, which does not have said other 1-st partial point data which is less distant than the 1-st threshold distance, as (1_1)-st partial point data; and (II_22) determining whether each of the (1_1)-st partial point data has at least one other (1_1)-st partial point data which is less distant than a 2-nd threshold distance in its corresponding same layer, thereby determining some part of the (1_1)-st partial point data, which does not have said other (1_1)-st partial point data which is less distant than a 2-nd threshold distance in its corresponding same layer, as the 2-nd partial point data.

13. The computing device of claim 11, wherein the process (II_3) has processes of:

(II_31) determining each the 2-nd partial point data as the specific point data, and accumulating the specific point data over the period of the time, thereby acquiring an accumulated representative value; and (II_32) comparing the accumulated representative value with an accumulated criterion value which is acquired by accumulating some part of the point data related to noise in a non-rainy environment, and when the accumulated representative value is larger than the accumulated criterion value, detecting the rainy environment by referring to the specific point data.

14. The computer device of claim 10, wherein, at the process (IV), when the object moves at a speed equal to or faster than a specific threshold speed, the processor saves each of movement states of the bounding box of the object for each unit of time, thereby determining a region containing the bounding box at a current unit of time and the bounding box at one or more previous units of time as the rear trajectory region.

15. The computer device of claim 10, wherein, at the process (IV), the total target detecting region includes the bounding box, the rear trajectory region, a pair of 1-st side regions on both sides of the bounding box, and a pair of 2-nd side regions on both sides of the rear trajectory region.

16. The computer device of claim 10, wherein, at the process (IV), the processor prevents one or more detection errors on the bounding box without clustering the 2-nd partial new point data, whose intensity is weaker than the 3-rd threshold intensity, among the subset of the new point data in the total target detecting region.

17. The computer device of claim 10, wherein, at the process (III), the processor acquires one or more partial lines of the bounding box by clustering the 1-st partial new point data corresponding to the object and thus predicts a rest of the partial lines of the bounding box, thereby detecting the bounding box.

18. The computer device of claim 10, wherein, at the process (I), the processor determines a virtual polyhedron where the point data are detected as the detection area, wherein the virtual polyhedron is set within the specific distance from the LiDAR sensor and wherein the virtual polyhedron is divided by the 1-st layer to the N-th layer.

* * * * *